United States Patent Office 3,373,222
Patented Mar. 12, 1968

3,373,222
COMPOSITIONS CONTAINING POLYAM-IDES, POLYOLEFINS AND CARBOXYL-ATED POLYETHYLENE
Robert G. Armstrong, Chicago Heights, Ill., assignor to Continental Can Company, Inc., New York, N.Y., a corporation of New York
No Drawing. Filed Sept. 10, 1965, Ser. No. 486,559
20 Claims. (Cl. 260—857)

ABSTRACT OF THE DISCLOSURE

Homogeneous polymeric blends resistant to permeation by organic fluids may be prepared from 40–60% by weight of a polyolefin resin, 40–60% by weight of a polyamide resin, and 2–10% by weight of a carboxylated polyethylene having an acid number from 2.75 to 50.

---

This invention is directed to a polymeric resin composition and more specifically to a homogeneous polymeric composition and to a method of preparing same. Still more specifically, this invention is directed to a homogeneous polymeric blend which is substantially resistant to the permeation of organic fluids and is capable of being shaped, e.g., extruded into various non-pinch crazing forms by using known methods and apparatus.

The homogeneous polymeric compositions or blends of this invention are prepared by dispersing a water-insoluble polyamide resin in a polyolefin resin by using a carboxylated linear polyethylene.

The carboxylated linear polyethylene improves the dispersion of the polyamide in the polyolefin to form stabilized blends which do not agglomerate in the molten state. These homogeneous polymeric blends are very useful in the preparation of films to be used for packaging and more specifically for the preparation of plastic bottles and similar containers which require a high degree of impermeability.

More specifically, the homogeneous polymeric blends or compositions of this invention consist essentially of 40% to 60% by weight of a polyolefin resin, i.e., polyethylene or polypropylene, 40% to 60% by weight of a water-insoluble polyamide resin, i.e., nylon, and 2% to 10% by weight of a carboxylated linear polyethylene having an acid number ranging from about 2.75 to 50. This homogeneous blend is substantially resistant to the permeation of fluids including many of the known organic solvents and may be easily shaped by conventional methods into various non-pinch crazing forms without any difficulties at temperatures ranging from about 300° to 500° F. and at pressures ranging from about 10 to 5,000 pounds per square inch.

With the continuous development of the polyolefins and with the widespread use, particularly polyethylene and polypropylene, it has been necessary to improve on the mechanical characteristics of these polymers so that they may be utilized for preparing various articles of commerce including, for example, films, fibers, sheets, bottles and other container-like articles required for packaging such items as oils, foodstuffs, cosmetics, hair tonics, deodorants, medicinals, liquid bleaches, detergents or the like.

Generally, polyethylene has been used for these purposes because of its relative inertness, structural strength and flexibility even at the low temperatures. Moreover, polyethylene is easily fabricated in commercial quantities at reasonable cost and is, therefore, highly desirable as a packaging material. Heretofore, small amounts of chemically inert and physically active inorganic materials have been kneaded to the polyolefins to obtain blends which have improved impact resistance. In addition, other additives have been added to the polyolefins to improve the morphological properties such as the internal cohesion, abrasion resistance, etc.

While many of these additives are known to improve the polymers' morphological characteristics, they do not, however, always improve on the polymers' resistance to pinch-crazing. It is highly important, particularly in preparing plastic pinch-bottles and the like, to have a polymeric material which has a quick deformation recovery and a high resistance to pinch-crazing. Thus, it has been found that by blending a water-insoluble polyamide resin with the polyolefin resin such as polyethylene and polypropylene in accordance with the procedure of this invention, it is possible to obtain a homogeneous blend of the two polymeric resins. The blends are not only improved with respect to pinch-craze, but also and more important, are improved with respect to their mechanical properties and are substantially resistant to the permeation of most of the organic solvents.

A limitation of known plastic materials normally used in preparing containers, for example, is that these materials are highly permeable to many of the organic solvents which are used conventionally in the formulation of the above-mentioned commercial products. For example, the various chemicals which permeate polyethylene at room temperature include the aliphatic and aromatic hydrocarbons, organic esters, ketones, and many of the other known solvents. Thus, the use of polyethylene has been limited to those products to which the resin is substantially impermeable. Moreover, in some special cases, it has become necessary in the past to utilize a time-consuming and expensive technique of coating the polyethylene with a layer of polymeric material known to be impermeable to the various commercial products. These coating materials include, for example, polyvinyl chloride, polyvinyl alcohol, copolymers of vinylidene chloride, polyamides, epoxide resins, etc. These coatings are normally applied on the side of the film or bottle which is in direct contact with the product in the package. This coating process involves pretreating the inside of the bottles or containers by known methods, such as flaming, electrical discharge, chlorination or chemical oxidation, so as to improve the adhesion of the coating material to the polyethylene surface.

In comparison to the polyethylene, however, the polyamides of the nylon type are substantially resistant to the permeability of many of the organic solvents indicated above and, additionally, may be printed on without requiring a surface treatment. Thus, while nylon and polyethylene are regarded as incompatible materials in that they have dissimilar properties, it would be highly advantageous if the desirable characteristics of each of these polymeric materials could be incorporated into a single product.

Consequently, in order to avoid the above-mentioned problems and to prepare a product having the advantages of both a polyolefin resin and a polyamide resin, it has been discovered that the polyamides of the nylon type can be homogeneously dispersed in the polyolefin, i.e., polyethylene or polypropylene, by utilizing a small but an effective amount of a carboxylated polyethylene having an acid number ranging from about 2.75 to 50 and more preferably in the range of about 2.75 to 20. The carboxylated linear polyethylene not only improves the dispersion of the two resins but also stabilizes the dispersion against agglomeration in the molten state. This suggests that the prevention of agglomeration or phase separation is accomplished by chemical attraction rather than mechanical action or viscosity fortification. At low concentrations, i.e., 2–10% by weight, the carboxylated polyethylene has no effect on the viscosity of the polyamide-polyolefin blend.

Accordingly, it is an object of this invention to provide a homogeneous polymeric blend which is substantially resistant to the permeation of organic fluids and is capable of being shaped into various non-pinch crazing forms without any difficulties.

It is still another object of this invention to provide a homogeneous polymeric blend which is substantially resistant to the permeation of organic fluids and which is capable of being extruded to various non-pinch craze forms at temperatures ranging from about 300° to 500° F. and at pressures ranging from about 10 to 5,000 pounds per square inch.

It is still another object of this invention to provide a method of preparing a polymeric resin composition which is resistant to the permeation of organic solvents and capable of being shaped into non-pinch crazing forms. The method comprises shaping said polymeric compositions at preferred temperatures ranging from about 390° to 450° F. and at pressures preferably ranging from about 400 to 2,000 pounds per square inch.

It is still another object of this invention to provide a method of preparing a homogeneous polymeric composition or blend which is impermeable to organic solvents and which has outstanding mechanical properties.

It is still a further object of this invention to provide a method of dispersing a polyamide of the nylon type into a polyolefin resin such as polyethylene and polypropylene to obtain a homogeneous blend which is stable and will not agglomerate in the molten state. The polyamide resins are dispersed in the polyolefin resins by means of a small but effective amount of a carboxylated linear polyethylene.

It is still a further object of this invention to provide a homogeneous polymeric blend and a method of preparing same which is substantially impermeable to organic fluids and which can be used in conventional extruding equipment for the preparation of plastic bottles and other types of packaging containers.

It is still a further object of this invention to provide a homogeneous blend of a polyamide resin and a polyolefin resin, i.e., polyethylene, which is substantially impermeable to organic fluids and which can be shaped into various forms by conventional methods with known equipment into non-pinch crazing bottles and like containers.

These and other objects of this invention will become apparent from a further and more detailed description as follows.

It has been discovered that a homogeneous blend of a polyamide resin of the nylon type and a polyolefin such as polyethylene or polypropylene can be obtained by dispersing the polyamide in the polyolefin with a small but effective amount of a dispersing material. More specifically, it has been discovered that homogeneous polymeric blends which are substantially resistant to the permeation of organic fluids, can be obtained by dispersing the polyamide into the polyolefin resin with the dispersing material at temperatures ranging from about 300° to 500° F. and at pressures ranging from about 10 to 5,000 pounds per square inch. More particularly, the dispersing material used to disperse the polyamide in the polyolefin is a linear carboxylated polyethylene and is utilized in amounts ranging from about 2 to 10% by weight of the mixture of the polyamide and polyolefin. This polymeric composition is kneaded together at the preferred temperatures ranging from about 390° to 450° F. at pressures ranging from about 400 to 2,000 pounds per square inch.

The homogeneous blends consist essentially of 40 to 60% by weight of a polyolefin resin such as polyethylene or polypropylene, 40 to 60% by weight of a water-insoluble polyamide resin such as nylon, and 2 to 10% by weight of a carboxylated linear polyethylene having an acid number ranging from about 2.75 to 50. When preparing blends from the low density polyethylene, it is desirable to blend approximately 45 to 55% by weight of the water-insoluble polyamide resin with about 45 to 55% by weight of the polyethylene, and 4 to 6% by weight of the carboxylated linear polyethylene dispersant.

The polyamides referred to herein as nylons are water-insoluble polyamides having recurring amide groups and are commercially available. They may be prepared, for example, from a cyclic ketone which is obtained by hydrogenating phenol to cyclohexanol which, in turn, is converted to cyclohexanone. The cyclic ketone is reacted with nitrogen-containing compounds to form seven-membered ring compounds, such as epsilon amino caprolactam, which is polymerized to what is known commercially as Nylon 6. Still other processes include the reaction of a dibasic organic acid such as adipic or sebacic, which is reacted with a diamine to form long-chain polymers commercially available as nylon. The number of connected carbon atoms between successive amide groups in the nylon depends upon the starting compound.

The polyamides or nylons may be defined also as water-insoluble, fiber-forming, synthetic polymeric carbon-amides which contain recurring carbonamide groups as an integral part of the main polymer chain separated by at least two carbon atoms. A polyamide, for purposes of this invention, may be prepared, for example by reacting approximately 15 parts by weight of a diamine with about 30 parts by weight of a carboxylic acid such as sebacic acid in the presence of about 45 parts by weight of a solvent. The reactor used for the polymerization is fitted with a distillation unit to return the solvent loss by distillation and with a means of introducing nitrogen into the reactor. The mixture is heated for approximately 10 to 15 hours at about 210°–220° C. The reaction products are then treated with an aliphatic alcohol to precipitate the polyamide in the form of a white granular material.

In addition, the polyamides may be prepared by reacting, for example, a carboxylic acid with a primary amine wherein the amine has at least 2 hydrogen atoms attached to each of the nitrogen atoms. This includes such compounds as ethylene diamine, tetramethylene diamine, pentamethylene diamine, hexamethylene diamine, octamethylene diamine, decamethylene diamine, and other primary amines with at least two carbon atoms between the amine groups. The carboxylic acids used in forming the amides include adipic acid, suberic acid, sebacic acid, azelaic acid, malonic acid, glutaric acid, pimelic acid, etc. Typical examples of the polyamides include polypentamethylene adipamide, polyhexamethylene adipamide, polydecamethylene adipamide, polyoctamethylene, adipamide, polyoctamethylene sebacamide, polyhexamethylene sebacamide, polypentamethylene sebacamide, polydecamethylene suberamide, polyhexamethylene, polypentamethylene suberamide, polyamides obtained from lactams, such as caprolactam, and from the amino acids, such as 11-aminoundecanoic acid.

By itself, nylon is substantially impermeable to organic solvents including the esters, ethers, hydrocarbons, etc., and has a high tensile strength in comparison to the polyethylene. The polyamides or nylons are permeable, however, to the lower alcohols, water and their vapors. In addition, the polyamides may be extruded only within a narrow range of temperatures above its melting point and, therefore, close temperature control is necessary in obtaining the proper viscosity for extrusion. This narrow temperature range complicates the use of nylon in blowing containers, such as pinch-bottles, from tubing by procedures normally employed for polyethylene. Moreover, the polyamides have a tendency to yellow at extrusion temperatures particularly when exposed to air and, therefore, in many instances are not considered satisfactory.

One of the characteristics of the polyamide type of nylons is the degree of crystallinity at room temperature which depends on various factors, including the degree of orientation or stretching, the rate of cooling from the melt and the annealing conditions. In comparison, polyethylene, upon cooling to room temperature, generally crystallizes to a degree dependent upon the chemical structure rather than the orientation or annealing conditions. Moreover, in comparison to the polyolefins, the degree of permeability attributed to nylon is generally due to its chemical composition rather than to the percent of crystallinity. However, the permeability of polyethylene, for example, depends upon the crystalline content of the polymer as determined by its structure, i.e., linear vs. branched structure, with the degree of permeability decreasing with increasing crystallinity.

The polyolefin resins and more specifically polyethylene may be prepared by known processes and can be characterized as a low density polyethylene having a specific gravity of about 0.92 or as a high density polyethylene having a specific gravity of about 0.95. The low density polyethylenes are often referred to as regular branched chain polyethylenes and are commercially available. These polyethylenes under X-ray examination have been found to comprise a crystalline content of about 50 to 55%. They are substantially permeable, particularly the polyethylenes which have a low percentage of crystalline macromolecules. The degree of permeability, however, decreases as the percent of the crystalline macromolecules increases. For example, a standard four-ounce bottle of polyethylene containing 50% crystalline macromolecules has been found to be permeated by heptane under standard test conditions to a loss of about 40 times the internal capacity of the container over a period of about one year.

The melting range of the commercial polyethylene begins at a softening point of about 220° to 230° F. and, therefore, may be extruded at temperatures ranging up to about 500° F. The higher extrusion temperatures may be employed since the viscosity of the polyethylene has a slow rate of change with temperature with little or no degradation during the heating and extrusion process. In addition to the low density polyethylenes, the high density polyethylenes having a specific gravity of about 0.95 are also commercially available and contain crystalline macromolecules in an amount ranging from about 70–85% with a corresponding reduction in its permeation to organic solvents.

Another polyolefin resin which may be used for purposes of this invention includes polpropylene and more specifically isotactic polypropylene which may be characterized as a crystalline to semi-crystalline polymer having a specific gravity or a density of about 0.91. The isotactic polypropylene, for example, may be characterized as a linear, regular head-to-tail polymer or propylene having a high degree of crystallinity which apparently is due to the fact that at least for long portions of the main polymer chains, all of the asymmetric carbon atoms have the same steric configuration.

The polymers of propylene depending on their steric structure and molecular weight exhibit different characteristics. The amorphous polymers, for example, have viscous elastic properties which lie between those of a highly viscous liquid and those of an unvulcanized, non-crystallizable elastomer, whereas the solid, highly crystalline polymers, which may be oriented, are fiber-forming. Both the amorphous and the crystalline polymers of propylene are, however, linear as shown by their infra-red spectra and have a highly stereo-regular structure as determined by X-ray data.

The isotactic polypropylenes which are comparatively crystalline may be prepared by polymerizing propylene with the aid of a catalyst consisting of a mixture, in an inert solvent, of an aluminum alkyl compound such as aluminum triethyl and a heavy metal compound such as titanium tetrachloride. Other catalytic systems, however, may be used for preparing the polypropylenes and more specifically the isotactic polypropylenes.

The dispersant used for preparing the blend of the water-insoluble polyamide in the polyolefin resin may be characterized as a carboxylated linear polyethylene having an acid number ranging anywhere from about 2.75 to 50 and more preferably in the range of about 2.75 to about 20. Thus, for example, polyethylene may be carboxylated by reaction with oxygen to obtain a product having a neutralization equivalent of about 2805 which is equivalent to an acid number of about 20 or has about 1% by weight of carboxyl groups. A commercially available carboxylated polyethylene is known as Opex 921–0549 which has a neutralization equivalence of about 20,400, an acid number of about 2.75 and a carbon-hydrogen-oxygen ratio of 85.3, 14.2 and 0.6, respectively. The neutralization equivalence was determined by titrating the carboxylated polyethylene in a mixture of butyl alcohol and xylene with the ratio of the solvents being 1 to 5 with a 0.1 normal potassium hydroxide in butyl alcohol with cresol red as the indicator. These carboxylated linear polyethylenes may be further characterized as having a density of about 0.96 and a melt index of about 0.1. They are used as a dispersant for the polyamide and polyolefin resins in amounts ranging from about 2 to 10% by weight and more preferably in amounts ranging from about 4 to 6% by weight of the mixture.

A typical illustration of a method of preparing the products of this invention is as follows:

*Example I*

An extruder feed mixture was prepared by tumble-mixing approximately 47.5% by weight of polyethylene and 47.5% by weight of a water-insoluble polyamide (Spencer nylon 600) and about 5% by weight of a carboxylated linear polyethylene. The carboxylated polyethylene was obtained by an oxidation reaction to an acid number of about 20 and was characterized as having a melt index of 0.1 and a density of 0.96.

The feed material was fed into a one-inch extruder equipped with polyethylene screw and operated at a temperature to produce a melt of about 432° to 438° F. The extruder, with the feed mixture being operated at the above melt temperatures, was equipped with a 55 hole breaker plate with holes of approximately 0.1 inch diameter, and equipped with a ⅛ inch diameter extrusion orifice. The extruder was operated at approximately 11 r.p.m., resulting in a through-put rate of approximately 800 grams per hour producing a pressure as measured at the end of the screw of approximately 10 to 50 pounds per square inch. The polymeric blend obtained by utilizing the carboxylated polyethylene as the dispersant had outstanding stability characteristics as illustrated by the following test.

Twenty micron thick cross-section samples of the extruded cylinder were prepared using a microtome. The samples, placed on a microscope slide, were heated and observed in a hot stage at 235° C. for about five minutes. The slide containing the samples were removed from the hot stage and observed microscopically through cross polarizing lenses while being cooled with air.

Photomicrographs made of the polymer blends before and after the hot stage treatment and visual microscopic observation of the samples showed that polymer blends of the aforementioned polyethylene and nylon which contained approximately 5% by weight of the linear carboxylated polyethylene were substantially more resistant to agglomeration than the same polymer blends without the carboxylated polyethylene dispersant. The control sample of ethylene and nylon without the presence of the carboxylated polyethylene was extruded and hot stage tested in the same manner as the polymeric blend containing the dispersant. Other polymeric blends were prepared by the same method wherein the polyethylene ranged from about 40–60% by weight, nylon ranged from about 40–60% by weight, and the carboxylated linear polyethylene ranged from about 2–10% by weight and more preferably from about 4–6% by weight of the blend. Various blends of nylon and polyethylene, for example, were extruded at pressures ranging from 10 to 5,000 pounds per square inch and more preferably at pressures ranging from about 400 to 2,000 pounds per square inch at temperatures ranging from about 390° to 500° F.

A typical example of a blend used in extruding comprises approximately 47.5% by weight of polyethylene, 47.5% by weight of nylon, and about 5% by weight of carboxylated linear polyethylene. The apparatus used in preparing the blends was a one-inch extruder which had a feed throat at room temperature, a rear-heater temperature of about 390° F., a middle-heater temperature of about 400° F., a front-heater temperature of about 410° F. and a die-heater temperature of about 420° F.

A number of four-ounce cylinder bottles were blown on a Blow-O-Matic and were tested for the impact resistance as indicated by the data in Table I.

TABLE I.—DROP TEST RESULTS
[Staircase Method]

| Four-Ounce Bottles | Average Wt. (Grams) | Failure Height | | |
|---|---|---|---|---|
| | | Average | Minimum | Maximum |
| Conaloy 3 | 11.7 | 8 | 7 | 10 |
| Conaloy 3R | 12.6 | 6 | 6 | 8 |

The bottles in Table I were prepared from a Conaloy blend comprising approximately 50% by weight of the nylon 600, 45% by weight of polyethylene and approximately 5% by weight of a carboxylated linear polyethylene having a neutralization number of about 20. The bottles were prepared in accordance with the procedure of Example I at a melt temperature of about 430° F., a screw speed of about 20 r.p.m. and a gate pressure of approximately 750 pounds per square inch. It was found that the drop impact resistance of the untreated bottles or bottles prepared from a blend of nylon and polyethylene was considerably low in comparison to the treated bottles prepared from a blend comprising polyethylene, nylon and 5% by weight of a linear carboxylated polyethylene in accordance with this invention.

Micrographs of the bottles' side walls at 100 magnifications made by utilizing transmitted polarized light indicate that the blends in accordance with this invention exhibited homogeneous particle dispersions. Moreover, there was no visible particle orientation, no delamination, and substantially no crazing.

Many of the problems encountered in preparing blends of nylon and a polyolefin such as polypropylene or polyethylene usually result in a phase separation or agglomeration. It was found, however, that blends could be satisfactorily stabilized by dispersing the nylon in the polyolefin by utilizing a dispersant such as the carboxylated polyethylene. While the mechanism by which this dispersion is obtained is not completely understood, it was found that by utilizing small amounts of the dispersant, it was possible to blend the nylon into the polyolefin to obtain a homogeneous mixture or blend without any difficulties and at comparatively low pressures, such as 10 to 50 pounds per square inch. Heretofore, in blending nylon with a polyolefin, it was usually necessary to use increased pressures which exceeded approximately 400 pounds per square inch and more preferably pressures were used which exceeded 500 pounds per square inch. Because of the dispersion characteristics of the carboxylated polyethylene, however, homogeneous blends or mixtures of the nylon and the polyolefin may be prepared at comparatively low pressures and at temperatures ranging from about 390° to 450° F.

It has been found that blends of polyolefins, such as polyethylene or polypropylene, with pure nylon have a significantly lower permeability factor for various organic solvents, e.g., alcohols, ketones, ethers, etc., than either of the polymers alone. Thus, it may be theorized that the non-crystalline nylon or polyamide occupies the regions of the amorphous macromolecules of the polyolefin which has a comparatively low degree of resistance to permeation. The reduction in the permeability of the polyethylene, for example, with increased crystalline macromolecules, supports this view. In other words, the nylon locates itself in the areas of the molecule where the polyethylene or polypropylene exhibits permeability and, thus, acts as a barrier. It has been found, that a mixture, for example, of about 50 parts by weight of a 50% crystalline polyethylene may be made substantially impermeable by the addition thereto of about 50 parts by weight of nylon whereas only 20 parts by weight of nylon is needed for the same polyethylene having a 70% crystallinity to obtain substantially the same results.

Consequently, it is desirable to disperse that proportion of nylon in the polyolefin which represents the non-crystalline or amorphous molecules. The coaction of the nylon with the non-crystalline component of the polyolefin, however, is not the sole criteria for obtaining impermeable blends. It is possible, for example, that intra-molecular grafting, produced by relative shear flow at high pressures, may produce composite molecules effective as blending agents for the normally incompatible components and, therefore, provide a product of higher resistance to permeation and delamination. By utilizing the carboxylated polyethylene as a dispersant for blending nylon in the polyolefin, homogeneous blends may be obtained which are improved not only with respect to impermeability, but also with respect to impact resistance, process stability, polymer morphology, etc.

In addition to the use of carboxylated polyethylene as a dispersant, it is obvious that other well-known materials may be used and included in the polymeric blend. These materials may include, for example, pigments, dyes, fillers, and the like. Many of these materials may be mixed with the polymers prior to being subjected to the kneading operation. The apparatus which can be employed for this purpose includes, for example, the Dulmage mixing screw with a gate valve installed between the discharge end of the extruder barrel and the rod forming die. A Bourdon-type pressure gauge and a thermocouple are installed between the extruder barrel and the gate valve. With the valve completely open, the gauge indicates a pressure of about 250 pounds per square inch and upon being slowly closed, the pressure reading approaches 1800 pounds per square inch. The speed of the screw drive is correspondingly increased to maintain a constant output flow.

While this invention has been described with respect to a number of specific embodiments, it is obvious that there are other variations and modifications which can be employed without departing from the true spirit of the invention, except as more particularly pointed out in the appended claims.

What is claimed is:

1. A homogeneous polymeric blend substantially resistant to the permeation of organic fluids and capable of being shaped into non-pinch-crazing forms which consists essentially of 40–60% by weight of a polyolefin resin, 40–60% by weight of a water-insoluble polyamide resin having amide groups as integral parts of the polymer chain, and 2–10% by weight of a carboxylated linear polyethylene having an acid number ranging from about 2.75 to 50.

2. The composition of claim 1 further characterized in that the polyolefin resin ranges from about 45–55% by weight and the polyamide resin ranges from about 45–55% by weight.

3. The composition of claim 2 further characterized in that the carboxylated linear polyethlene is present in the blend in an amount ranging from about 4–6% by weight.

4. The composition of claim 1 further characterized in that the polyolefin resin is polyethylene.

5. The composition of claim 4 further characterized in that the polyethylene has density of about 0.92.

6. A homogeneous polymeric blend substantially resistant to the permeation of organic fluids and capable of being shaped into non-pinch-crazing forms which consists essentially of 45–55% by weight of a polyolefin selected from the group consisting of polyethylene and polypropylene, 45–55% by weight of a water-insoluble polyamide resin having amide groups as integral parts of the polymer chain, and 4–6% by weight of a linear carboxylated polyethylene having an acid number ranging from about 2.75 to 50.

7. The composition of claim 6 further characterized in that the polyolefin resin is polyethylene having a density of about 0.92.

8. The composition of claim 6 further characterized in that the polyolefin resin is polypropylene.

9. A method of preparing a homogeneous polymeric resin composition substantially resistant to the permeation of organic fluids and capable of being shaped into non-pinch-crazing forms which comprises kneading a mixture of polymeric resins at a temperature ranging from about 300° to 500° F. at pressures ranging from about 10 to 5,000 pounds per square inch; said polymeric resin mixture consisting essentially of 40–60% by weight of a polyamide resin having amide groups as integral parts of the polymer chain, 40–60% by weight of a polyolefin resin and 2–10% by weight of a carboxylated linear polyethylene having an acid number ranging from about 2.75 to 50.

10. The method of claim 9 further characterized in that the polymeric mixture is kneaded at temperatures ranging from about 400° to 450° F. at pressures ranging from about 400 to 2,000 pounds per square inch.

11. The method of claim 10 further characterized in that the polyolefin resin is polyethylene.

12. The method of claim 10 further characterized in that the polyamide resin ranges from about 45–55% by weight and the polyolefin resin ranges from about 45–55% by weight.

13. The method of claim 12 further characterized in that the carboxylated linear polyethylene is present in an amount ranging from about 4–6% by weight of the polymeric resin mixture and has an acid number ranging from about 2.75 to 20.

14. The method of claim 13 further characterized in that the polyolefin resin is polyethylene having a density of about 0.92.

15. A method of preparing a homogeneous polymeric resin composition substantially resistant to the permeation of organic fluids and capable of being shaped into non-pinch-crazing forms which comprises kneading a mixture of polymeric resins at temperatures ranging from about 390° to 450° F. at pressures ranging from about 400 to 2,000 pounds per square inch; said polymeric resin mixture consisting essentially of 45–55% by weight of a polyolefin resin selected from the group consisting of polyethylene and polypropylene, 45–55% by weight of a polyamide resin having amide groups as integral parts of the polymer chain, and 4–6% by weight of a carboxylated linear polyethylene having an acid number ranging from about 2.75 to 20.

16. The method of claim 15 further characterized in that the polyolefin resin is polyethylene.

17. The method of claim 15 further characterized in that the polyolefin resin is polypropylene.

18. The method of claim 15 further characterized in that the polymeric resin composition is kneaded and shaped into non-pinch-crazing forms in an extruder at temperatures ranging from about 390° to 450° F.

19. The method of claim 18 further characterized in that the polymeric mixture is extruded at pressures ranging from about 400 to 2,000 pounds per square inch.

20. A method of preparing plastic bottles from a polymeric resin composition substantially resistant to the permeation of organic fluids and capable of being shaped into non-pinch-crazing forms which comprises kneading a mixture of the polymeric resins in an extruder at temperatures ranging from about 390° to 450° F. at pressures ranging from about 400 to 2,000 pounds per square inch; said polymeric resin composition consisting essentially of 40–60% by weight of polyethylene, 40–60% by weight of a polyamide resin having amide groups as integral parts of the polymer chain, and 4–6% by weight of a carboxylated linear polyethylene having an acid number ranging from about 2.75 to 20.

References Cited

UNITED STATES PATENTS

| | | | |
|---|---|---|---|
| 3,093,255 | 6/1963 | Mesrobian | 260—857 |
| 3,274,289 | 9/1966 | Murdock | 260—857 |

MURRAY TILLMAN, *Primary Examiner.*

P. LIEBERMAN, *Assistant Examiner.*